Sept. 29, 1964 R. M. WEBER 3,150,842
VEHICLE MOUNTED WIRE WINDER

Filed March 20, 1962 2 Sheets-Sheet 1

INVENTOR.
Robert M. Weber
BY
Victor J. Evans & Co.
Attorneys

Sept. 29, 1964 R. M. WEBER 3,150,842
VEHICLE MOUNTED WIRE WINDER
Filed March 20, 1962 2 Sheets-Sheet 2
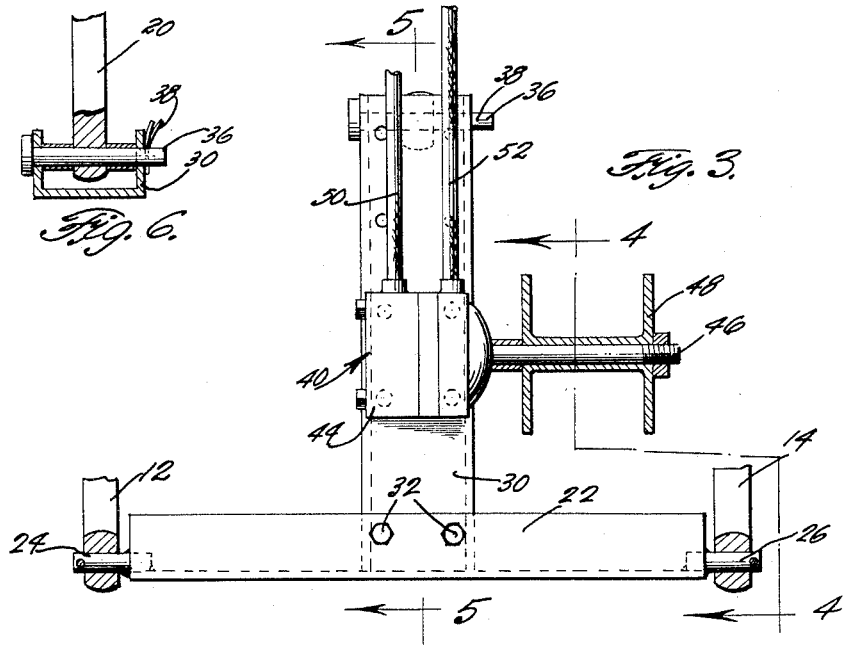
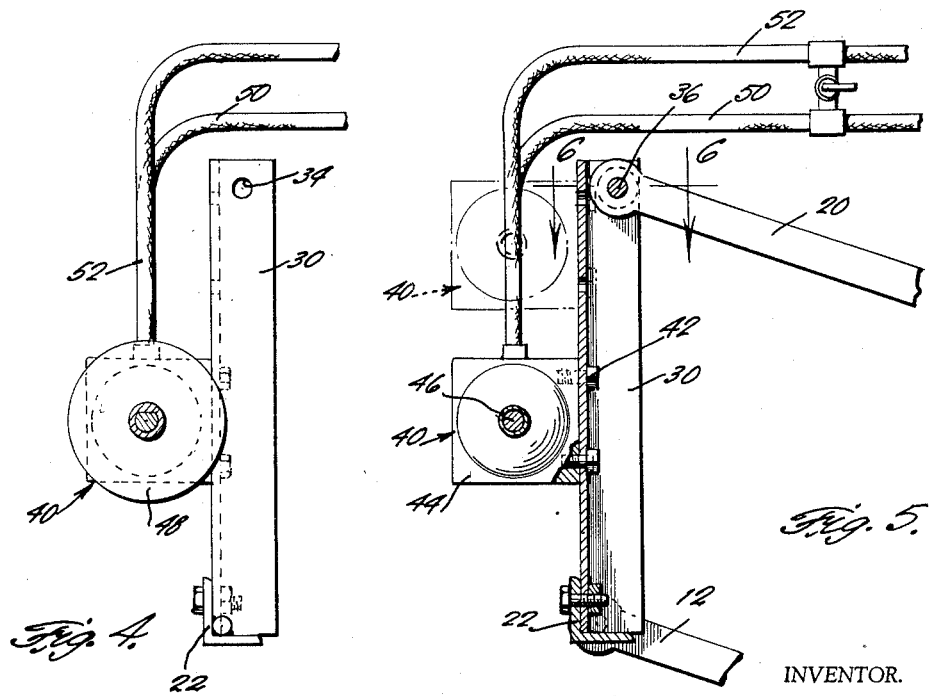
INVENTOR.
Robert M. Weber
BY
Victor J. Evans Co.
Attorneys

United States Patent Office 3,150,842
Patented Sept. 29, 1964

3,150,842
VEHICLE MOUNTED WIRE WINDER
Robert M. Weber, Box 125, Gering, Nebr.
Filed Mar. 20, 1962, Ser. No. 181,070
1 Claim. (Cl. 242—86.5)

The present invention relates to tractors generally and in particular to a vehicle having a power winch or wire winder mounted thereon.

An object of the present invention is to provide a wire winder or winch for mounting on a vehicle, the winch being hydraulically driven and using the vehicle's hydraulic fluid.

Another object of the present invention is to provide a wire winder or winch for mounting on a vehicle which is simple to operate, one having a smooth delivery of power, one which has a power unit capable of operating in either direction, for winding or unwinding wire or cable thereon, and one which is foolproof in operation.

A further object of the present invention is to provide a winch for mounting on a vehicle which is with facility fastened to the vehicle and is easily removed, one which is simple in structure and sturdy of construction, and one which is economical to fabricate and assemble.

Figure 1:
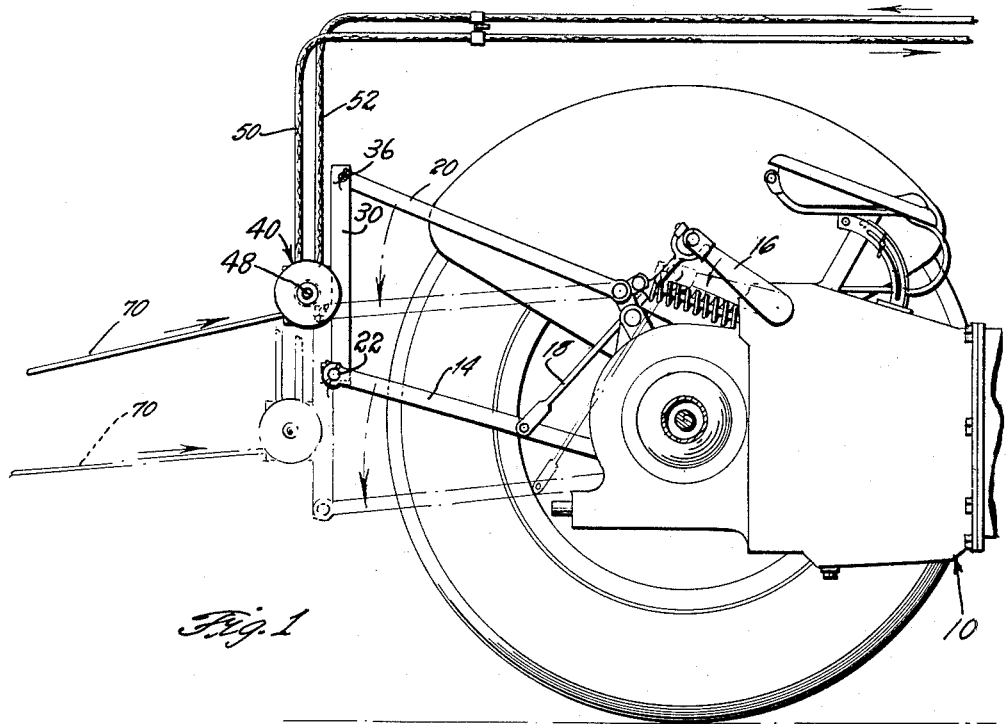
Figure 2:
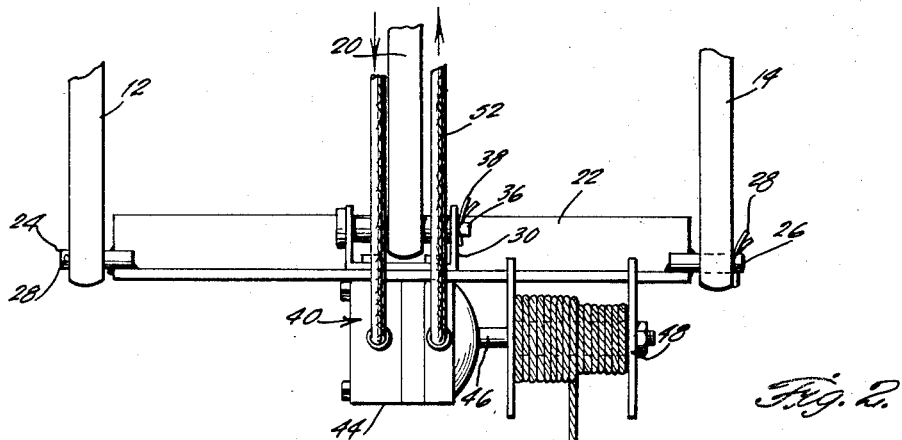
Figure 7:
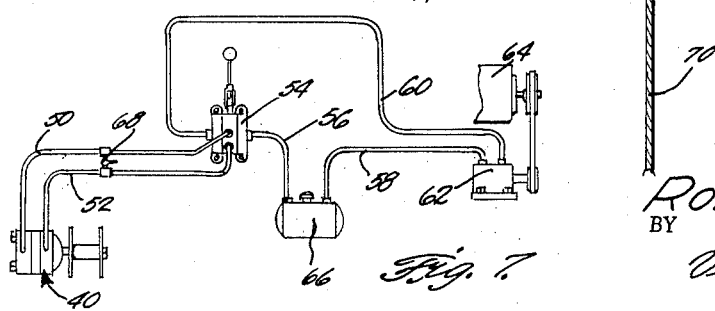

With these objects in mind, reference is made to the attached drawings, in which:

FIGURE 1 is a view in elevation of the rearward end portion of a vehicle, one wheel being removed, showing the device of the present invention installed thereon, FIGURE 2 is a top plan view of a portion of the assembly shown in FIGURE 1, FIGURE 3 is a top plan view with the drum of the winch shown in section, FIGURE 4 is a view on the line 4—4 of FIGURE 3, FIGURE 5 is a view on the line 5—5 of FIGURE 3, FIGURE 6 is a fragmentary view on the line 6—6 of FIGURE 5, with a portion broken away, and FIGURE 7 is a schematic view of the control for the winch of the present invention.

Referring to the drawings in detail, like numerals indicating like parts throughout the several views, a vehicle is designated generally by the reference numeral 10 and it includes, in the rearward portion thereof, a pair of substantially parallel spaced lift arms 12 and 14, arranged in an upwardly sloping direction and having their one adjacent ends pivotally connected to the vehicle 10 for swinging movement about their connections as a horizontal axis.

A power arm 16 has one end connected to the fluid motor of the vehicle 10 for swinging movement of the arm 16 and a link 18 connects the free end of the arm 16 to the lift arm 14, as shown in FIGURE 1. A similar link (not shown) connects the free end of the power arm 16 to the outer lift arm 12.

A support arm 20 is positioned above and between the lift arms 12 and 14 and has one end pivotally connected to the vehicle 10 for swinging movement about its connection as a horizontal axis.

A horizontally disposed beam 22 is positioned between the free ends of the lift arms 12 and 14 and is connected thereto for movement therewith.

A pin 24 projects from one end of the beam 22 and is received in a hole provided in the free end of the lift arm 12. Another pin 26 projects from the other end of the beam 22 and is received in a hole provided in the free end portion of the lift arm 14.

Cotter pins 28, extending through holes provided in the free end portions of the pins 24 and 26, provide a means for detachably securing the beam 22 to the arms 12 and 14.

A vertically disposed post element 30 is disposed on the side of the beam 22 adjacent the vehicle 10 and has its lower end portion secured by bolts 32 to the mid-part of the beam 22.

The beam 22 is fabricated of angle iron and the post element 30 is fabricated of channel iron so that it has its lower end resting upon one flange of the beam 22. The post element 30 has its flanges facing the vehicle 10 and the upper portion thereof is provided with a pair of holes 34 receiving therethrough a pin 36 which extends through the free end portion of the support arm 20. A cotter pin 38 extends through a hole provided in the free end portion of the pin 36 and is used as a means for retaining the pin 36 in the flanges of the post element 30.

A winch mechanism 40 is secured by bolts 42 to the post element 30 intermediate the upper and lower ends of the latter. The winch mechanism 40 includes a fluid motor 44 which operates in either direction, a motor shaft 46, and a drum 48 mounted on the motor shaft 46 for rotation therewith.

Conduits 50 and 52 connect the fluid motor 44 to a control valve 54 and other conduits 56, 58, and 60 connect the control valve 54 to a fluid pump 62 driven by the engine 64 of the vehicle. A reservoir 66 contains a supply of hydraulic fluid for use by the pump 62.

As an alternative, the control valve 54 may be in circuit with the fluid pressure lines of the vehicle if the vehicle is so equipped.

A feature of the invention resides in a safety valve 68 disposed between the conduits 50 and 52, as shown in FIGURE 7, the valve 68 operating to relieve pressure in the conduits 50 and 52 when the winch drum 48 is prevented from turning by a snagged cable or wire being wound thereon, or for any other reason.

An important feature of the invention is mounting of the mechanism 40 on the lift arms 12 and 14 and on the support arm 20 so that the winch mechanism 40 can be moved from the full line position to the dotted line position in FIGURE 1 upon execution of the movement of the vehicle power arm 16. This enables the operator of the vehicle to apply pulling movement to the wire or cable being wound on the drum 48, as at 70 in FIGURE 1 and FIGURE 2, without movement of the drum 48 about its axis. The slow movement of the winch mechanism upwardly on the lift arms 14 applies a small pull to the cable or wire 70 and effects its movement toward the vehicle 10 in small increments of movement.

In use, the winch drum 48 may be used to wind the cable or wire 70 thereon by admitting fluid under pressure to the motor 44 and controlling the same by means of the control valve 54. The drum 48 may be reversely driven so as to pay the cable out at a given rate as the vehicle moves across a field if desired.

As shown in FIGURE 5 of the drawings, the mechanism 40 may be shifted to another position upwardly on the post element 30, if desired.

While only a preferred form of the present invention is shown and described, other embodiments of the invention are contemplated, and changes may be made in the invention or the invention may be modified for production reasons without departing from the spirit of the invention, as set forth in the appended claim.

What is claimed is:

In combination with a vehicle having a pair of spaced substantially parallel lift arms projecting in an upwardly sloping direction from one end thereof and a support arm disposed between and above said lift arms, said lift arms and said support arm being connected at their one adjacent ends to said vehicle for swinging movement about horizontal axes, a horizontally disposed beam extending between said lift arms and detachably secured thereto for movement therewith, a vertically disposed post element positioned so that the lower end thereof is adjacent the face of said beam contiguous to said vehicle and intermediate the ends of said beam, the upper end of said post element being adjacent the other end of said support arm, means detachably securing the portion of said post element adjacent the upper end to said support arm other end for movement therewith, and a fluid driven winch mechanism including a fluid motor and a horizontally disposed drum, said motor being secured to said post element intermediate said upper and lower ends of the latter.

References Cited in the file of this patent

UNITED STATES PATENTS

| | | |
|---|---|---|
| 1,791,744 | Osgood | Feb. 10, 1931 |
| 2,605,976 | Henggeler | Aug. 5, 1952 |
| 2,876,916 | Austrow et al. | Mar. 10, 1959 |
| 3,000,587 | Goode | Sept. 19, 1961 |